United States Patent
Frederiksen et al.

(10) Patent No.: US 11,511,798 B2
(45) Date of Patent: Nov. 29, 2022

(54) HYDRAULIC STEERING UNIT

(71) Applicant: Danfoss Power Solutions ApS, Nordborg (DK)

(72) Inventors: Mogens Frederiksen, Nordborg (DK); Poul Ennemark, Nordborg (DK); Casper Mikael Olesen, Nordborg (DK); Niels Arbjerg, Nordborg (DK); Charles Anthony Bates, Nordborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 152 days.

(21) Appl. No.: 17/042,364

(22) PCT Filed: May 16, 2019

(86) PCT No.: PCT/EP2019/062690
§ 371 (c)(1),
(2) Date: Sep. 28, 2020

(87) PCT Pub. No.: WO2019/219850
PCT Pub. Date: Nov. 21, 2019

(65) Prior Publication Data
US 2021/0024125 A1 Jan. 28, 2021

(30) Foreign Application Priority Data

May 18, 2018 (DE) .................... 102018112044.3

(51) Int. Cl.
*B62D 5/08* (2006.01)
*B62D 5/093* (2006.01)
*B62D 5/14* (2006.01)

(52) U.S. Cl.
CPC ............... *B62D 5/093* (2013.01); *B62D 5/14* (2013.01); *B62D 5/08* (2013.01)

(58) Field of Classification Search
CPC ............. B62D 5/08; B62D 5/14; B62D 5/093
(Continued)

(56) References Cited

U.S. PATENT DOCUMENTS 4,676,334 A * 6/1987 Nakamura ........... B62D 5/0835
91/375 A
9,550,521 B2 1/2017 Andersen et al.

FOREIGN PATENT DOCUMENTS

CN 103921838 A 7/2014
CN 106043420 A 10/2016
(Continued)

OTHER PUBLICATIONS

First Examination Report for Indian Patent Application No. 202017041021 dated Apr. 2, 2021.
(Continued)

*Primary Examiner* — Tony H Winner
*Assistant Examiner* — Felicia L. Brittman
(74) *Attorney, Agent, or Firm* — McCormick, Paulding & Huber PLLC

(57) ABSTRACT

A hydraulic steering unit includes a pressure port connected to a main flow path and a tank port connected to a tank flow path, and a working port arrangement having left and right working flow paths. A first bridge arrangement has first left and first right orifices connected to the main flow path and to first left or first right connecting points, respectively, each connecting point associated respectively with the left or right working flow paths, and second left and second right orifices connected to the tank flow path and to the first left or first right connecting points, respectively. A second bridge arrangement has a similar orifice arrangement connected to second left or second right connecting points. The first and second bridge arrangements have different steering characteristics. Selection means for connecting one of the bridge (Continued)

arrangements between the pressure port and the working port arrangement are provided.

20 Claims, 3 Drawing Sheets

(58) Field of Classification Search
USPC .......................................................... 180/441
See application file for complete search history.

(56) References Cited

FOREIGN PATENT DOCUMENTS

| | | | |
|---|---|---|---|
| JP | 11129922 A | * | 5/1999 |
| JP | H11129922 A | | 5/1999 |
| JP | 11180322 A | * | 7/1999 |
| JP | H11180322 A | | 7/1999 |

OTHER PUBLICATIONS

International Search Report for PCT Serial No. PCT/EP2019/062690 dated Aug. 7, 2019.

* cited by examiner

HYDRAULIC STEERING UNIT

CROSS-REFERENCE TO RELATED APPLICATIONS

This application is a National Stage application of International Patent Application No. PCT/EP2019/062690, filed on May 16, 2019, which claims priority to German Patent Application No. 102018112044.3 filed on May 18, 2018, each of which is hereby incorporated by reference in its entirety.

TECHNICAL FIELD

The present invention relates to a hydraulic steering unit comprising a supply port arrangement having a pressure port connected to a main flow path and a tank port connected to a tank flow path, a working port arrangement having a left working port connected to a left working flow path and a right working port connected to a right working flow path, a first bridge arrangement of variable orifices having a first left orifice connected to the main flow path and to a first left connecting point at the left working flow path, a first right orifice connected to the main flow path and to a first right connecting point at the right working flow path, a second left orifice connected to the first left connecting point at the left working flow path and to the tank flow path, and a second right orifice connected to the first right connecting point at the right working flow path and to the tank flow path.

BACKGROUND

Such a hydraulic steering unit is known, for example, from U.S. Pat. No. 4,676,334 A. Such a steering unit can be used to steer a vehicle, i.e. to change the running direction of steered wheels of the vehicle. The running direction of the steered wheels is changed by means of a steering motor which is connected to the working port arrangement. The steering motor is actuated by hydraulic fluid from the pressure port which is guided to the working ports through the bridge arrangement. Basically the bridge arrangement provides two flow paths. Specifically, to steer to the left, the flow path comprises the first left orifice and the second right orifice, so that hydraulic fluid from the pressure port flows through the first left orifice to the steering motor on one side and hydraulic fluid displaced from the steering motor flows back through the right working port and through the second right orifice to the tank port.

Some vehicles equipped with such a steering unit are used under changing conditions, for example on road and off road. To enable a comfortable steering for the driver it is desirable to adapt the steering behavior of the hydraulic steering unit to the different conditions.

SUMMARY

Accordingly it is an object of the present invention to have a steering unit the steering characteristics of which can be changed.

This object is solved with hydraulic steering unit as described at the outset by at least a second bridge arrangement of variable orifices having a third left orifice connected to the main flow path and to a second left connecting point at the left working flow path, a third right orifice connected to the main flow path and to a second right connecting point at the right working flow path, a fourth left orifice connected to the second left connecting point at the left working flow path and to the tank flow path, and a fourth right orifice connected to the second right connecting point at the right working flow path and to the tank flow path, wherein the first bridge arrangement and the second bridge arrangement have different steering characteristics, and by selection means connecting at least one of the bridge arrangements between the supply port arrangement and the working port arrangement.

The two bridge arrangements are each in form of a wheatstone bridge, wherein one diagonal is arranged between the main flow path and the tank flow path and the other diagonal is arranged between the two working flow paths. The two bridge arrangements are arranged in parallel between the supply port arrangement and the working port arrangement. Since the bridge arrangements have different steering characteristics, it is possible to change the steering behavior of the steering unit by selecting the appropriate bridge arrangement. To this end the selection means are provided. The selection means can be actuated by the driver of the vehicle or automatically depending on the conditions under which the vehicle is operated.

In an embodiment of the invention the selection means act concurrently in the right working flow path and in the left working flow path. In other words, the same steering characteristics are automatically selected for both steering directions.

In an embodiment of the invention the selection means have a common actuation signal inlet for the right working flow path and for the left working flow path. This is a simple way to guarantee the concurrent actuation of the selection means in both working flow paths.

In an embodiment of the invention the selection means have a single drive. When the drive is operated, it actuates the selection means for both working flow paths at the same time.

In an embodiment of the invention the first bridge arrangement comprises a reaction characteristic and the second bridge arrangement comprises a non-reaction characteristic. When the selection means select the first bridge arrangement the driver of the vehicle senses a reaction at the steering wheel when the steered wheels are loaded with external forces, for example when the vehicle runs through a curve or when a steered wheel hits against an obstacle. When the selection means select the second bridge arrangement there is no transmission of these external forces to the steering wheel. It is of course possible to use other steering means instead of the steering wheel.

In an embodiment of the invention the variable orifices of the first bridge arrangement are open in the neutral position and the variable orifices of the second bridge arrangement are closed in the neutral position. This is a simple way to achieve a reaction characteristic or the non-reaction characteristic, respectively.

In an embodiment of the invention the selection means establish or interrupt a flow path from the supply port arrangement through the second bridge arrangement to the working port arrangement. In this way it is possible to operate the two bridge arrangements in parallel or to operate exclusively the first bridge arrangement.

In an embodiment of the invention the selection means establish or interrupt a flow path from the supply port arrangement through the first bridge arrangement to the working port arrangement. In this way it is possible to select the second bridge arrangement only or to operate the two bridge arrangements in parallel.

In an embodiment of the invention the selection means establish or interrupt a flow path from the supply port arrangement through the second bridge to the working port arrangement and interrupt or establish at the same time a flow path from the supply port arrangement through the first bridge to the working port arrangement. In this case it is possible to select only one of the bridge arrangements or to operate the two bridge arrangements in parallel.

In an embodiment of the invention the selection means are in form of a 4/2-valve, in form of a 6/2-valve, or in form of a 6/3-valve. When the selection means are in form of a 4/2-valve it is possible to select either a single one of the bridge arrangements or a combination of the two bridge arrangements. When a 6/2-valve is used, it is possible to select one of the bridge arrangements. When the section means are in form of a 4/3-valve it is possible to select three operating conditions, i.e. the first bridge arrangement only, the second bridge arrangement only or the first bridge arrangement and the second bridge arrangement in parallel.

BRIEF DESCRIPTION OF THE DRAWINGS

Embodiments of the invention are now described in more detail with reference to the drawing, in which.

DETAILED DESCRIPTION

Figure 1:
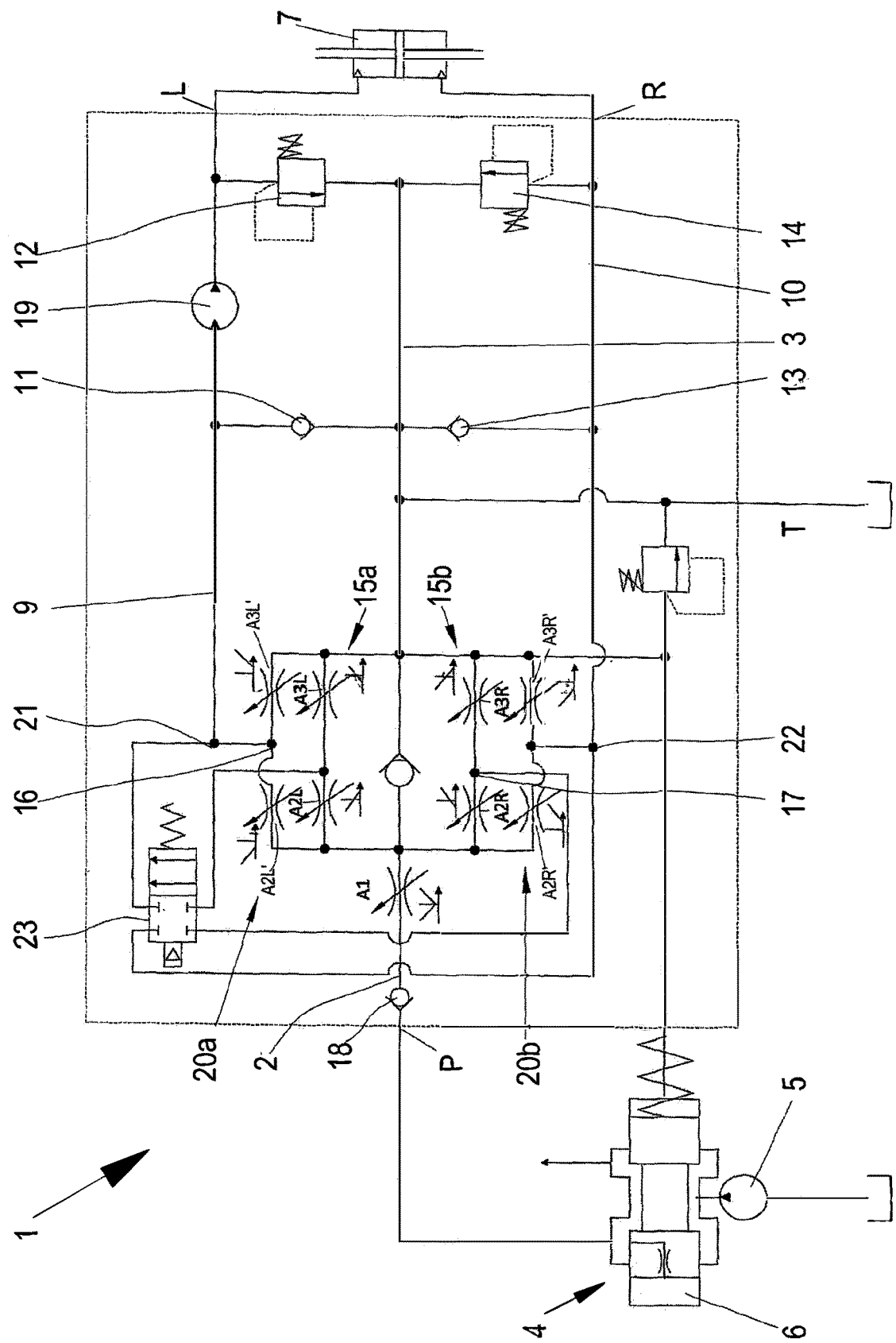
FIG. 1 shows a first embodiment of a hydraulic steering unit.

In all figures the same elements are referred to with the same reference numerals.

FIG. 1 shows schematically a hydraulic steering unit 1 comprising a supply port arrangement having a pressure port P and a tank port T. The pressure port P is connected to a main flow path 2. The tank port T is connected to a tank flow path 3.

The pressure port P is connected to a pressure source 4 which in the present case comprises a pump 5 and a priority valve 6. However, basically any other pressure source can be used.

The steering unit 1 furthermore comprises a working port arrangement having a left working port L and a right working port R. A steering motor 7 is connected to the working ports L, R.

The left working port L is connected to a left working flow path 9 and the right working port R is connected to a right working flow path 10. The left working flow path 9 is connected to the tank flow path 3 by means of a check valve 11 opening in a direction towards the left working flow path 9 and by means of a pressure relief valve 12. The right working flow path 10 is connected to the tank flow path 3 by means of a check valve 13 opening in a direction towards the right working flow path 10 and by means of a pressure relief valve 14.

A first bridge arrangement 15a, 15b of variable orifices is connected to the main flow path 2 and to the tank flow path 3. Furthermore, the first bridge arrangement 15a, 15b is connected to the left working flow path 9 and to the right working flow path 10.

The first bridge arrangement 15a, 15b is in form of a wheatstone bridge, one diagonal of which is arranged between the supply port P and the tank port T and the other diagonal is arranged between the two working ports L, R. The first bridge arrangement 15a, 15b comprises a first left orifice A2L which is connected to the main flow path 2 and to the left working flow path 9. The connection to the left working flow path 9 is made at a first left connecting point 16. Furthermore, the first bridge arrangement 15 comprises a first right orifice A2R which is connected to the main flow path 2 and to the right working flow path 10 at a first right connecting point 17. The first bridge arrangement 15a, 15b furthermore comprises a second right orifice A3L connected to the first left connecting point 16 and to the tank flow path 3. Furthermore, the first bridge arrangement 15a, 15b comprises a second right orifice A3R which is connected to the first right connecting point 17 and to the tank flow path 3.

All orifices of the first bridge arrangement 15a, 15b are variable orifices which are open in neutral position which is indicated by the small graph close to the respective orifices.

A main orifice A1 is arranged in the main flow path 2 between the pressure port P and the first bridge arrangement 15a, 15b. A check valve 18 opening in a direction towards the bridge arrangement 15a, 15b is arranged between the pressure port P and the main orifice A1. The main orifice A1 is as well a neutral open orifice. A neutral open orifice allows a small flow of hydraulic fluid in a neutral position of the steering unit 1.

A measuring motor 19 is arranged in the left working flow path 9. Alternatively, the measuring motor 19 can be arranged in the right working flow path 10.

A second bridge arrangement 20a, 20b is arranged basically in parallel to the first bridge arrangement 15a, 15b. The second bridge arrangement 20a, 20b is in form of a wheatstone bridge as well. The diagonal of the wheatstone bridge is connected between the supply port P and the tank port T and the other diagonal of the bridge is arranged between the two working ports L, R.

The second bridge arrangement 20a, 20b comprises four variable orifices A2L', A3L', A2R', A3R', which are closed in neutral position which is symbolized by the small symbols next to the orifices.

The orifices are termed third and fourth orifices in order to distinguish them from the first and second orifices.

The third left orifice A2L' is connected to the main flow path 2 and to the left working flow path 9. The fourth left orifice A3L' is connected to the left working flow path 9 and to the tank flow path 3. The third right orifice A2R' is connected to the main flow path 2 and to the right working flow path 10. The fourth right orifice A3R' is connected to the right working flow path 10 and to the tank flow path T. Consequently, a first half 20a of the second bridge arrangement 20a, 20b comprises a second left connecting point 21 and a second half 20b of the second bridge arrangement 20a, 20b comprises a second right connecting point 22.

Selection means 23 in form of a 4/2-valve are arranged between the first bridge arrangement 15a, 15b and the working port arrangement L, R. In other words, the first bridge arrangement 15a, 15b is not connected directly to the left working flow path 9 and to the right working flow path 10, but only via the selection means 23. On the other hand, the second bridge arrangement 20a, 20b is connected directly to the left working flow path 9 and to the right working flow path 10.

Accordingly it is possible to use only the second bridge arrangement 20a, 20b for steering (in the position of the selection means 23 shown) so that the steering unit 1 shows a non-reaction behavior. In the neutral position of the steering unit 1 the orifices of the second bridge arrangement 20a, 20b are closed.

When the driver wants to have a steering behavior with reaction, the selection means 23 is actuated to connect the first left connecting point 16 to the left working flow path 9 and the first right connecting point 17 to the right working flow path 10. In this way always, i.e. also in neutral position of the steering unit, there is an open flow path from the working port arrangement L, R in a direction to the supply port P.

The orifices A1, A2L, A3L, A2R, A3R, A2L', A3L', A2R', A3R' can be realized, for example, in a spool-sleeve arrangement. The spool-sleeve arrangement comprises a spool which is rotatably mounted in a sleeve. The set of spool and sleeve is rotatably mounted in a housing. A steering wheel or the like is connected to one of the spool and the sleeve. The measuring motor 19 is connected to the other one of the spool and the sleeve. When the steering wheel is actuated, the spool is rotated relatively to the sleeve and opens some orifices and closes some other orifices. The flow flowing through the bridge arrangements 15a, 15b, 20a, 20b drives the measuring motor 19. The measuring motor 19 restores the spool-sleeve set to a neutral position as soon as the necessary amount of fluid has been supplied to the working port arrangement L, R.

When, for example, the steering motor 7 should be steered to the left, the first left orifice A2L, the third left orifice A2L', the second right orifice A3R and the fourth right orifice A3R' are opened and the second left orifice A3L and the fourth left orifice A3L', the first right orifice A2R and the third right orifice A2R' are closed. When the selection means 23 are in the position not shown in FIG. 1 hydraulic fluid from the pressure port P flows through the first and third left orifice A2L, A2L', the measuring motor 19 and the left working flow path 9 to the left working port L. Hydraulic fluid displaced from the steering motor enters the steering unit at the right working port R and flows back through the right working flow path 10 and the second and fourth right orifice A3R, A3R' to the tank flow path 3 and from there to the tank port T.

The opening/closing behavior of all orifices is shown by symbols near the orifices. A vertical axis defines the neutral position. An inclined line schematically shows an opening degree of the respective orifice.

The use of the first bridge arrangement 15a, 15b having neutral open orifices has the advantage that steering out of the neutral position can be made very smooth. Furthermore, the driver experiences a reaction at the steering wheel. When it is desired to have no reaction, the first bridge arrangement 15a, 15b is switched off.

It is, of course, possible to use the selection means 23 in another way, i.e. to connect the first left connection point 16 directly to the left working flow path 9 and the first right connection point 17 directly to the right working flow path 10 and to connect the second bridge arrangement 20a, 20b only via the selection means 23 to the respective working flow path 9, 10. In this way (not shown) it is possible to select the two bridge arrangements 15a, 15b; 20a, 20b together or to only select the first bridge arrangement 15a, 15b.

Figure 2:
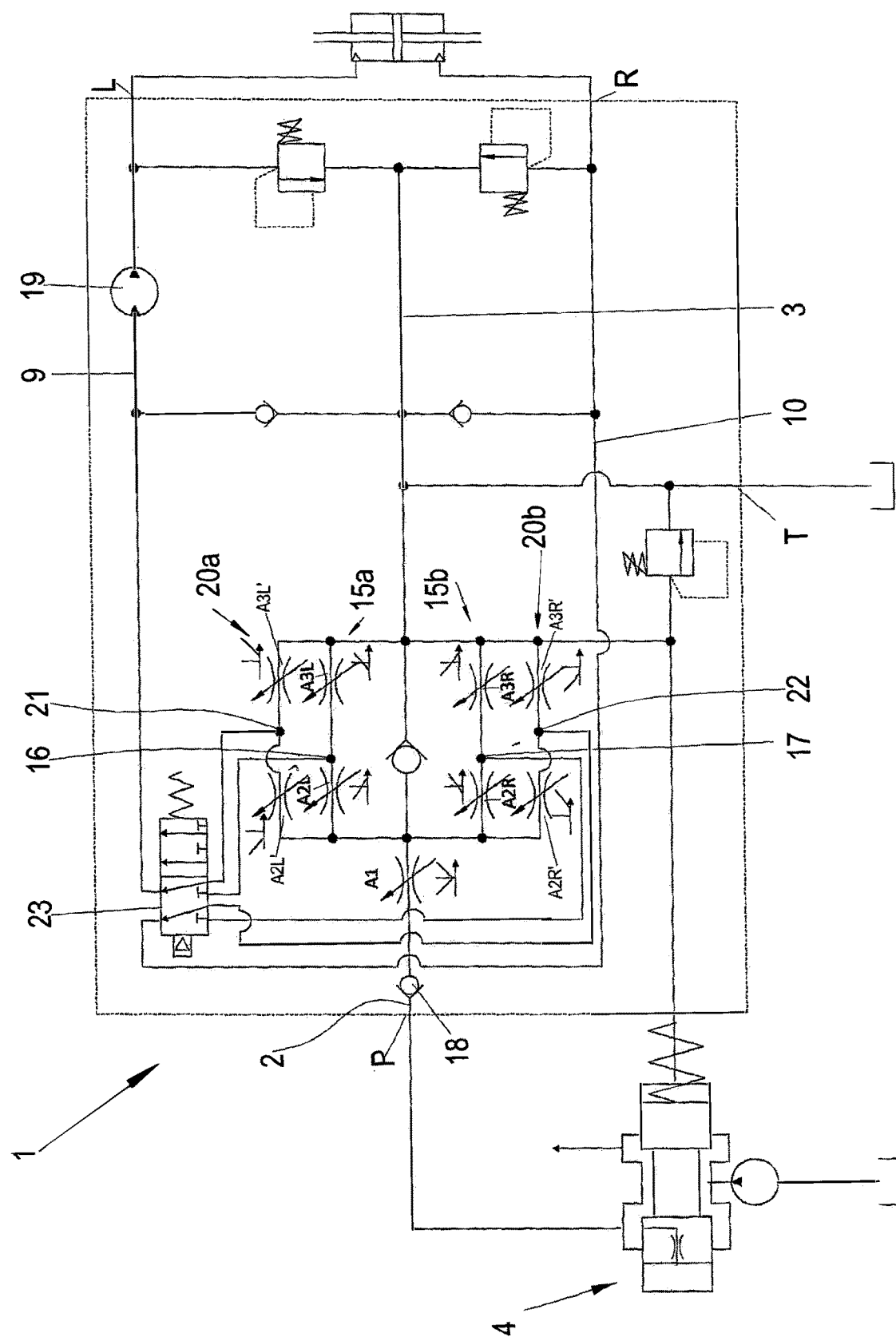
FIG. 2 shows a second embodiment of a hydraulic steering unit.

FIG. 2 shows a second embodiment of the invention in which the only difference is the selection means 23 and the connection of the selection means 23 and the two bridge arrangements 15a, 15b; 20a, 20b to the respective working flow paths 9, 10.

In the second embodiment of the hydraulic steering unit 1 the selection means 23 is a 6/2-valve. The inlet of this valve is connected to both left connecting points 16, 21 on the one hand and to both right connecting points 17, 22 on the other hand. The outlet of the valve is connected to the two working flow path 9, 10.

The selection means 23 can select one of the two bridge arrangements 15a, 15b, 20a, 20b, i.e. it can connect the first left connecting point 16 to the left working flow path 9 and the first right connecting point 17 to the right working flow path 10 or it can connect the second left connecting point 21 to the left working flow path 9 and the second right connecting point 22 to the right working flow path 10.

Apart from this difference the steering unit 1 of the embodiment shown in FIG. 2 corresponds to that of FIG. 1.

Figure 3:
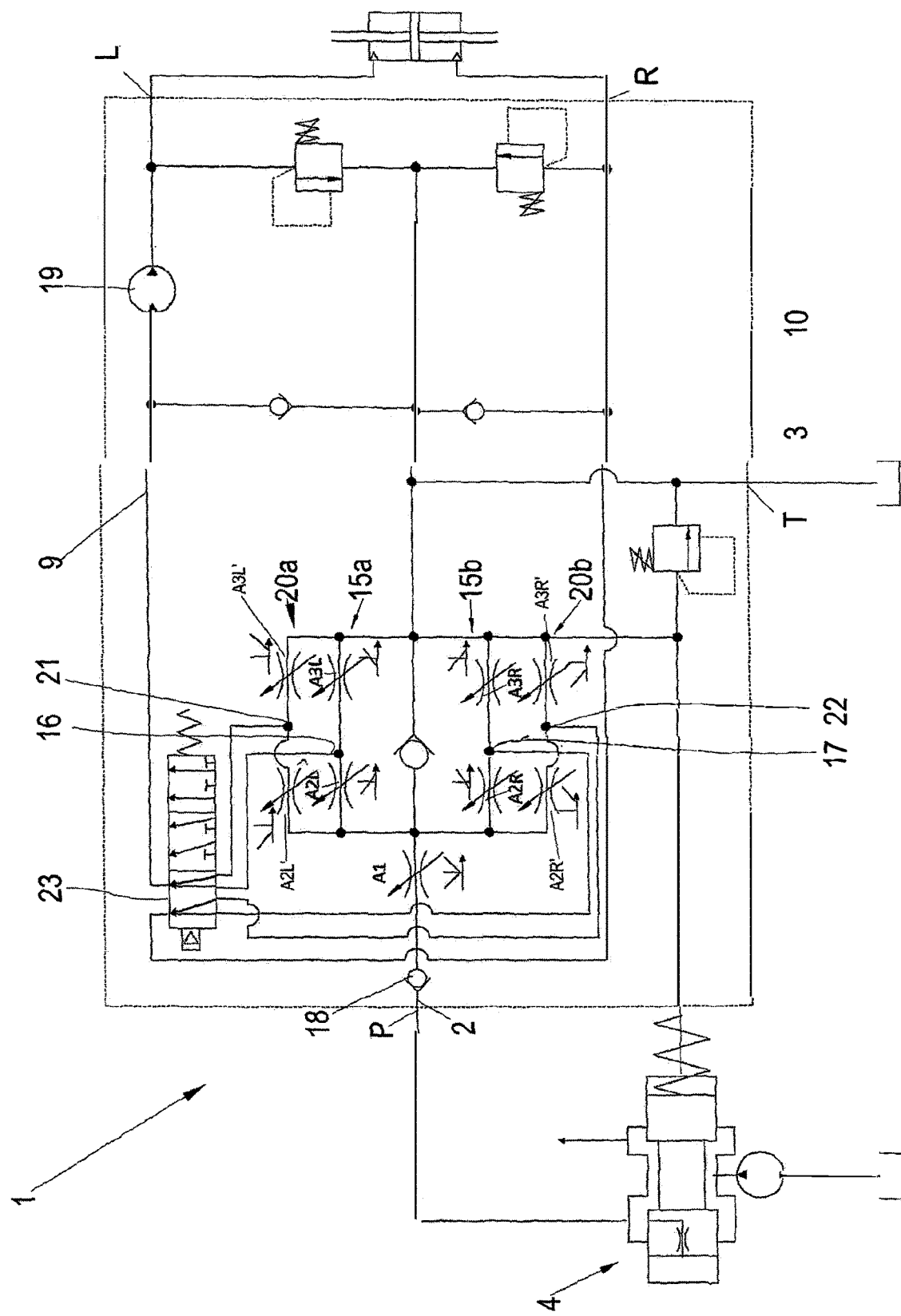
FIG. 3 shows a third embodiment of a hydraulic steering unit.

FIG. 3 shows a third embodiment in which the selection means 23 have again a different form.

The selection means 23 according to the embodiment shown in FIG. 3 has the same inlet and the same outlet at the embodiment shown in FIG. 2. However, there are three possibilities to choose which of the bridge arrangements 15a, 15b; 20a, 20b are used for steering.

A first possibility is the switching state of the selection means 23 shown in FIG. 1. In this possibility both bridge arrangements 15a, 15b; 20a, 20b are used. A second switching state of the selection means 23 connects only the second bridge arrangement 20a, 20b to the respective working flow paths 9, 10. In a third switching state the selection means 23 connects only the first bridge arrangement 15a, 15b to the working flow paths 9, 10.

In all embodiments the selection means 23 act concurrently in the right working flow path 10 and in the left working flow path 9, i.e. the steering behavior for steering directions is the same.

This can be realized, for example, by using a common drive 24 for the selection means 23 or at least to use a common actuation signal inlet for the part of the selection means 23 acting in the left working flow path 9 and the part of the selection means 23 acting in the right working flow path 10.

The simplest way to realize this is the way shown, i.e. the selection means has a single drive 25 and is in form of a single valve which can be in form of a 4/2-valve (FIG. 1), a 6/2-valve (FIG. 2) or a 6/3-valve (FIG. 3).

It is of course possible to use more than the two bridge arrangements 15a, 15b; 20a, 20b shown.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering unit comprising a supply port arrangement having a pressure port connected to a main flow path and a tank port connected to a tank flow path, a working port arrangement having a left working port connected to a left working flow path and a right working port connected to a right working flow path, a first bridge arrangement of variable orifices having a first left orifice connected to the main flow path and to a first left connecting point at the left working flow path, a first right orifice connected to the main flow path and to a first right connecting point at the right working flow path, a second left orifice connected to the first left connecting point at the left working flow path and to the tank flow path, and a second right orifice connected to the first right connecting point at the right working flow path and to the tank flow path, wherein at least a second bridge arrangement of variable orifices having a third left orifice connected to the main flow path and to a second left connecting point at the left working flow path, a third right orifice connected to the main flow path and to a second right connecting point at the right working flow path, a fourth left orifice connected to the second left connecting point at the left working flow path and to the tank flow path, and a fourth right orifice connected to the second right connecting point at the right working flow path and to the tank flow path, wherein the first bridge arrangement and the second bridge arrangement have different steering characteristics, and by selection means connecting at least one of the bridge arrangements between the pressure port and the working port arrangement, wherein the first bridge arrangement comprises a reaction characteristic and the second bridge arrangement comprises a non-reaction characteristic.

2. The hydraulic steering unit according to claim 1, wherein the selection means act concurrently in the right working flow path and in the left working flow path.

3. The hydraulic steering unit according to claim 2, wherein the selection means have a common actuation signal inlet for the right working flow path and in the left working flow path.

4. The hydraulic steering unit according to claim 3, wherein the selection means have a single drive.

5. The hydraulic steering unit according to claim 3, wherein the selection means establish or interrupt a flow path from the supply port arrangement through the second bridge arrangement to the working port arrangement.

6. The hydraulic steering unit according to claim 2, wherein the selection means have a single drive.

7. The hydraulic steering unit according to claim 6, wherein the selection means establish or interrupt a flow path from the supply port arrangement through the second bridge arrangement to the working port arrangement.

8. The hydraulic steering unit according to claim 2, wherein the selection means establish or interrupt a flow path from the supply port arrangement through the second bridge arrangement to the working port arrangement.

9. The hydraulic steering unit according to claim 2, wherein the selection means establish or interrupt a flow path from the supply port arrangement through the first bridge arrangement to the working port arrangement.

10. The hydraulic steering unit according to claim 1, wherein the variable orifices of the first bridge arrangement are open in the neutral position and the variable orifices of the second bridge arrangement are closed in the neutral position.

11. The hydraulic steering unit according to claim 10, wherein the selection means establish or interrupt a flow path from the supply port arrangement through the second bridge arrangement to the working port arrangement.

12. The hydraulic steering unit according to claim 1, wherein the selection means establish or interrupt a flow path from the supply port arrangement through the second bridge arrangement to the working port arrangement.

13. The hydraulic steering unit according to claim 1, wherein the selection means establish or interrupt a flow path from the supply port arrangement through the first bridge arrangement to the working port arrangement.

14. The hydraulic steering unit according to claim 1, wherein the selection means establish or interrupt a flow path from the supply port arrangement through the second bridge arrangement to the working port arrangement and interrupt or establish at the same time a flow path from the supply port arrangement through the first bridge arrangement to the working port arrangement.

15. The hydraulic steering unit according to claim 1, wherein the selection means are in form of a 4/2-valve or in form of a 6/2-valve or in form of a 6/3-valve.

16. A hydraulic steering unit comprising a supply port arrangement having a pressure port connected to a main flow path and a tank port connected to a tank flow path, a working port arrangement having a left working port connected to a left working flow path and a right working port connected to a right working flow path, a first bridge arrangement of variable orifices having a first left orifice connected to the main flow path and to a first left connecting point at the left working flow path, a first right orifice connected to the main flow path and to a first right connecting point at the right working flow path, a second left orifice connected to the first left connecting point at the left working flow path and to the tank flow path, and a second right orifice connected to the first right connecting point at the right working flow path and to the tank flow path, wherein at least a second bridge arrangement of variable orifices having a third left orifice connected to the main flow path and to a second left connecting point at the left working flow path, a third right orifice connected to the main flow path and to a second right connecting point at the right working flow path, a fourth left orifice connected to the second left connecting point at the left working flow path and to the tank flow path, and a fourth right orifice connected to the second right connecting point at the right working flow path and to the tank flow path, wherein the first bridge arrangement and the second bridge arrangement have different steering characteristics, and by selection means connecting at least one of the bridge arrangements between the pressure port and the working port arrangement, wherein the selection means establish or interrupt a flow path from the supply port arrangement through the second bridge arrangement to the working port arrangement and interrupt or establish at the same time a flow path from the supply port arrangement through the first bridge arrangement to the working port arrangement.

17. The hydraulic steering unit according to claim 16, wherein the selection means establish or interrupt a flow path from the supply port arrangement through the second bridge arrangement to the working port arrangement.

18. The hydraulic steering unit according to claim 16, wherein the switching means act concurrently in the right working flow path and in the left working flow path.

19. The hydraulic steering unit according to claim 16, wherein the selection means have a common actuation signal inlet for the right working flow path and in the left working flow path.

20. The hydraulic steering unit according to claim 16, wherein the selection means have a single drive.

\* \* \* \* \*